United States Patent
Nakai et al.

(10) Patent No.: US 6,945,236 B2
(45) Date of Patent: Sep. 20, 2005

(54) EGR CONTROL APPARATUS FOR ENGINE

(75) Inventors: Eiji Nakai, Fuchu-cho (JP); Yoshiyuki Matsumoto, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 26 days.

(21) Appl. No.: 10/872,048

(22) Filed: Jun. 17, 2004

(65) Prior Publication Data

US 2005/0000497 A1 Jan. 6, 2005

(30) Foreign Application Priority Data

Jul. 2, 2003 (JP) ........................................ 2003-270339

(51) Int. Cl.[7] ............................................. F02M 25/07
(52) U.S. Cl. ............................... 123/568.12; 123/568.2; 60/605.2
(58) Field of Search ............ 123/568.11, 568.21–568.29, 123/302; 60/598, 660, 602, 605.2, 612

(56) References Cited

U.S. PATENT DOCUMENTS

| | | | | |
|---|---|---|---|---|
| 4,231,225 A | * | 11/1980 | Aya | .............................. 60/612 |
| 5,329,912 A | | 7/1994 | Matsumoto et al. | |
| 5,657,630 A | * | 8/1997 | Kjemtrup et al. | ........... 60/605.2 |
| 5,771,868 A | * | 6/1998 | Khair | ..................... 123/568.12 |
| 5,791,146 A | * | 8/1998 | Dungner | ..................... 60/605.2 |
| 5,806,308 A | * | 9/1998 | Khair et al. | .................... 60/278 |
| 5,937,650 A | * | 8/1999 | Arnold | ....................... 60/605.2 |
| 6,041,602 A | * | 3/2000 | Dickey | ...................... 60/605.2 |
| 6,085,712 A | | 7/2000 | Ma | |
| 6,138,649 A | | 10/2000 | Khair et al. | |
| 6,328,003 B1 | * | 12/2001 | Gaertner et al. | ............ 123/58.8 |
| 6,351,946 B1 | * | 3/2002 | Faletti | ........................ 60/605.2 |
| 6,386,154 B1 | * | 5/2002 | Hellman et al. | ............ 123/58.8 |
| 6,435,166 B1 | * | 8/2002 | Sato et al. | .............. 123/568.12 |
| 6,553,959 B2 | * | 4/2003 | Xu et al. | ...................... 123/295 |
| 2001/0029935 A1 | * | 10/2001 | Cook | ..................... 123/568.27 |

FOREIGN PATENT DOCUMENTS

| | | |
|---|---|---|
| JP | 11-62715 | 3/1999 |
| JP | 2000-329009 | 11/2000 |
| JP | 2002276405 | 9/2002 |

* cited by examiner

Primary Examiner—Henry C. Yuen
Assistant Examiner—Arnold Castro
(74) Attorney, Agent, or Firm—Brooks Kushman P.C.

(57) ABSTRACT

According to the invention, an EGR control apparatus of an engine includes intake ports to which an intake passage is connected, the intake ports opening into each combustion chamber of the engine, an EGR port to which an EGR passage branching out from an exhaust passage is connected, the EGR port opening into each combustion chamber of the engine, an electrically-operated compressor disposed in the EGR passage for regulating pressure at which EGR gas is introduced into each combustion chamber, and an EGR control valve disposed in the EGR passage at a point downstream of the electrically-operated compressor for controlling the amount of EGR gas introduced into each combustion chamber. The EGR passage branches out from the exhaust passage at a point downstream of an emission control device disposed in the exhaust passage.

4 Claims, 9 Drawing Sheets

LOW-LOAD CONDITIONS

HIGH-LOAD CONDITIONS

EGR CONTROL APPARATUS FOR ENGINE

BACKGROUND OF THE INVENTION

1. Field of the Invention

The present invention relates to an exhaust gas recirculation (EGR) control apparatus of an engine designed to introduce exhaust gas, or EGR gas, back to a combustion chamber. More particularly, the invention pertains to an EGR control apparatus capable of introducing EGR gas into a combustion chamber even under high-load conditions.

2. Description of the Related Art

Conventionally, EGR systems are widely used to reduce the amount of nitrogen oxides (NOx) contained in exhaust gases by reducing combustion temperature in combustion chambers of an engine. Generally, the EGR system includes an EGR passage connecting an exhaust passage to an intake passage to recirculate part of the exhaust gas from the exhaust passage to the intake passage and into a combustion chamber. The amount of EGR gas recirculated through the EGR passage is regulated by an EGR control valve disposed in the EGR passage according to operating conditions of the engine.

A motive force that forces the EGR gas to flow from exhaust side back to intake side is a difference between exhaust pressure and intake pressure. In the EGR system thus constructed, it is difficult to maintain a sufficient amount of recirculated EGR gas under high-load conditions due to a reduction in the difference between the exhaust and intake pressures. This is because the intake pressure increases due to an increase in the amount of intake air during high-load conditions. A resulting problem is that the conventional EGR system can not exert a sufficient EGR effect, or sufficiently reduce the amount of NOx, under high-load conditions.

A previous approach to the resolution the aforementioned problem is shown in Japanese Unexamined Patent Publication No. 1999-62715, for example, in which an EGR system includes a dedicated compressor disposed in an EGR passage for increasing EGR gas pressure to enable recirculation of the EGR gas even under high-load conditions. Another previous approach is found in Japanese Unexamined Patent Publication No. 2000-329009, in which there is formed a dedicated EGR port besides an intake port and an exhaust port for introducing the EGR gas directly into a cylinder head. An EGR passage of this EGR system is connected to the EGR port, and not to the intake port, so that the EGR gas can be independently introduced into a combustion chamber without any influence of intake pressure in the intake port. The EGR system of Patent Publication No. 2000-329009 further includes an EGR pump disposed in the EGR passage for forcibly introducing the EGR gas into the combustion chamber through the EGR port.

The EGR gas flowing through the EGR passage is a high-temperature gas as it is part of the exhaust gas. The EGR gas may also contain unburned fuel components. If the EGR system is for a diesel engine, the EGR gas may further contain particulates. Pressure control devices, such as the aforementioned dedicated compressor and EGR pump disposed in the EGR passage, are exposed to a fluid having such properties (i.e., a high-temperature gas potentially containing unburned fuel components and particulates), so that these pressure control devices should be of a type having sufficient heat resistance, durability and reliability. Nevertheless, the prior art does not disclose any measures to be taken to achieve this requirement.

SUMMARY OF THE INVENTION

In view of the foregoing, it is an object of the invention to provide an EGR system which makes it possible to introduce EGR gas into combustion chambers regardless of operating conditions of an engine even under high-load conditions. More particularly, it is an object of the invention to achieve heat resistance, durability and reliability of a pressure controller disposed in an EGR passage.

According to the invention, an EGR control apparatus of an engine includes a first port to which an intake passage is connected, the first port opening into a combustion chamber of the engine, a second port to which an EGR passage branching out from an exhaust passage is connected, the second port opening into the combustion chamber of the engine, an electrically-operated pressure controller disposed in the EGR passage for regulating pressure at which EGR gas is introduced into the combustion chamber, and an EGR control valve disposed in the EGR passage at a point downstream of the pressure controller for controlling the amount of EGR gas introduced into the combustion chamber, wherein the EGR passage branches out from the exhaust passage at a point downstream of an emission control device disposed in the exhaust passage.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
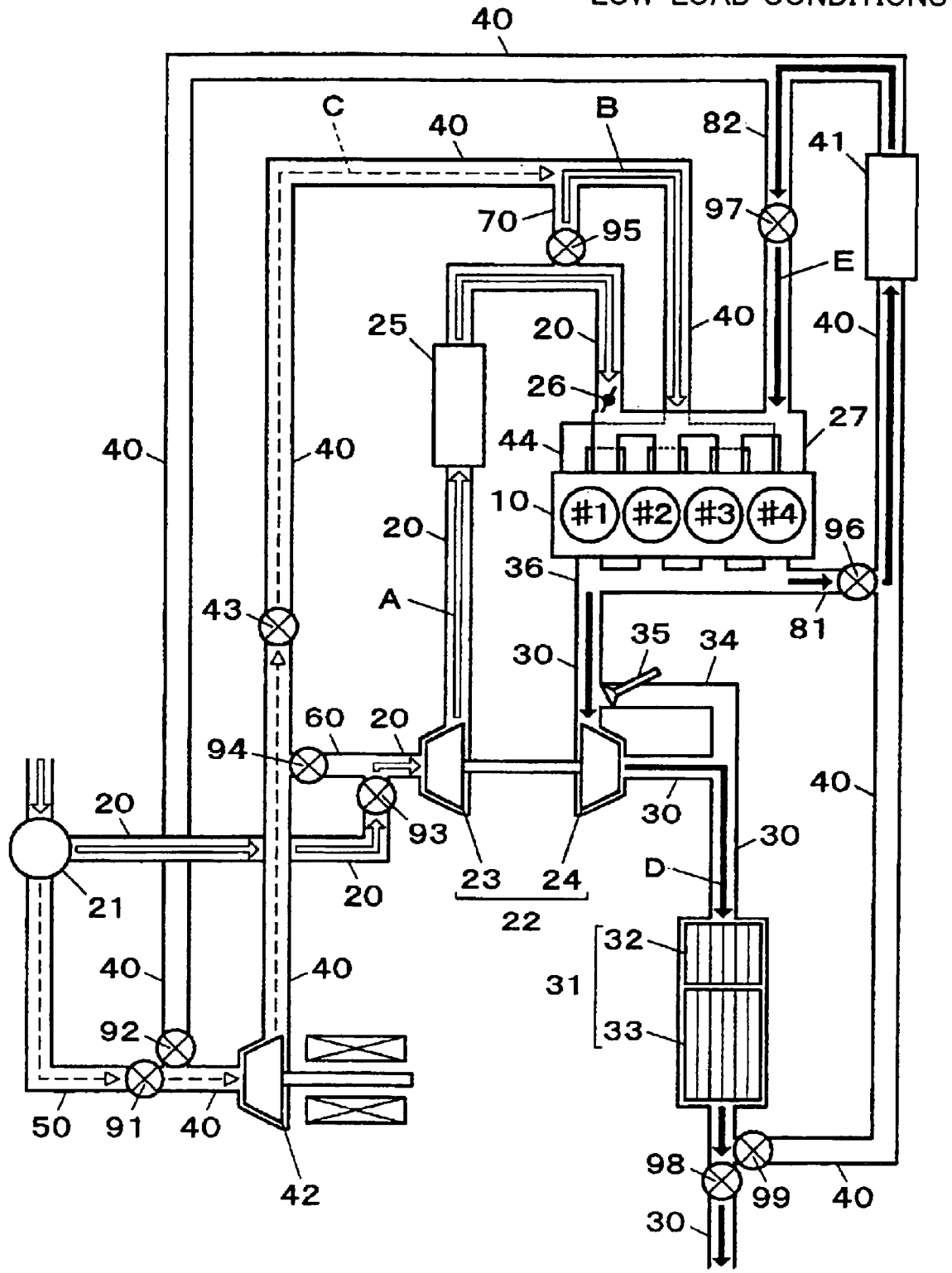
FIG. 1 is a diagram showing the layout of various fluid passages of an engine according to a preferred embodiment of the invention as well as flows of intake air, exhaust gas and EGR gas under low-load conditions.

A preferred embodiment of the present invention is described, by way of example, with reference to a fourcylinder diesel engine 10 employing an EGR system shown in FIG. 1. The engine 10 has an intake passage 20, an exhaust passage 30 and an EGR passage 40. There are disposed an air cleaner 21, a compressor 23 of a supercharger 22, an intercooler 25 and an intake air throttle valve 26 in the intake passage 20 from an upstream side thereof along the direction of fluid flow. A downstream end of the intake passage 20 is connected to an engine body 10 through an intake manifold 27.

On the other hand, there are disposed a turbine 24 of the supercharger 22 and an emission control device 31 in the exhaust passage 30 from an upstream side thereof along the direction of fluid flow. Driven by the turbine 24 disposed in the exhaust passage 30, the compressor 23 disposed in the intake passage 20 supercharges the engine 10 by compressing intake air flowing through the intake passage 20 into combustion chambers of engine cylinders 100. The emission control device 31 incorporates an oxidization catalyst element 32 and a particulate filter 33 which are arranged in series. The exhaust passage 30 is further associated with a wastegate 34 bypassing the turbine 24. The amount of fluid flowing through the turbine 24 can be reduced by opening a wastegate valve 35 disposed in the wastegate 34. An upstream side of the exhaust passage 30 is connected to the engine body 10 through an exhaust manifold 36.

The EGR passage 40 of this engine 10 branches out from the exhaust passage 30 at a point downstream of the emission control device 31. There are disposed an EGR cooler 41, an electrically-operated compressor 42 and an EGR control valve 43 in the EGR passage 40 along the direction of fluid flow. A downstream end of the EGR passage 40 is connected to the engine body 10 through a dedicated manifold 44. The electrically-operated compressor 42 serves as a pressure controller for regulating pressure at which EGR gas is introduced into the combustion chambers, whereas the EGR control valve 43 serves to control the amount of EGR gas introduced into the combustion chambers.

Figure 2:
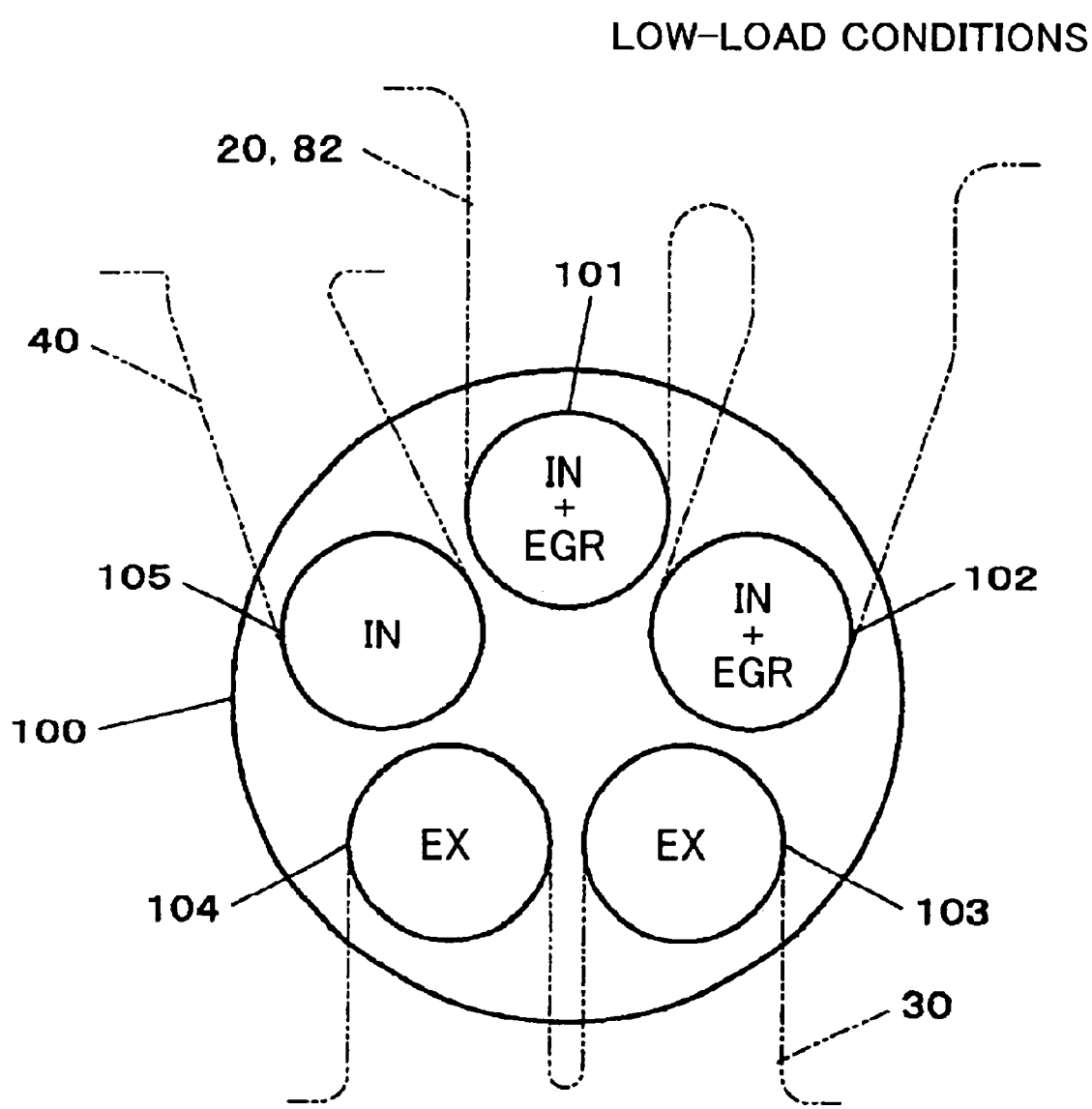
FIG. 2 is an explanatory diagram showing how individual fluid passages are connected to ports opening into a combustion chamber of the engine as well as a relationship between the ports and types of fluids flowing through the individual ports under low-load conditions.

There are formed five ports 101–105 in each of the cylinders 100 as shown in FIG. 2. Although not illustrated, there are provided on-off valves in the individual ports 101–105. These on-off valves delimit a combustion chamber in each cylinder 100 when closed and allow fluids to be drawn into or expelled from the combustion chamber when opened. The intake passage 20 connects to two intake ports (first ports) 101, 102 through the intake manifold 27, the exhaust passage 30 connects to two exhaust ports 103, 104 through the exhaust manifold 36, and the EGR passage 40 connects to one EGR port (second port) 105 through the dedicated manifold 44.

Referring again to FIG. 1, the engine 10 is further provided with an auxiliary intake passage 50, a first interconnect passage 60, a second interconnect passage 70 and auxiliary EGR passages 81, 82. The auxiliary intake passage 50 connects from the air cleaner 21 to the EGR passage 40 to enable introduction of the intake air into the EGR passage 40. The auxiliary intake passage 50 connects the intake passage 20 to the EGR passage 40 at a point upstream of the electrically-operated compressor 42.

The first interconnect passage 60 connects between the EGR passage 40 and the intake passage 20 to enable introduction of the EGR gas flowing through the EGR passage 40 into the intake passage 20. The first interconnect passage 60 branches out from the EGR passage 40 at a point between the electrically-operated compressor 42 and the EGR control valve 43 and connects to the intake passage 20 at a point upstream of the supercharger compressor 23.

While the second interconnect passage 70 also connects between the EGR passage 40 and the intake passage 20, the second interconnect passage 70 is located downstream of the first interconnect passage 60. Specifically, the second interconnect passage 70 branches out from the EGR passage 40 at a point downstream of the EGR control valve 43 and connects to the intake passage 20 at a point downstream of the supercharger compressor 23.

The auxiliary EGR passage 81 connects the exhaust manifold 36 to the EGR passage 40 at a point upstream of the EGR cooler 41 whereas the auxiliary EGR passage 82 connects the EGR passage 40 to the intake manifold 27 at a point downstream of the EGR cooler 41. The auxiliary EGR passages 81, 82 thus arranged enable recirculation of exhaust gases from within the exhaust manifold 36 into the intake manifold 27.

There are provided multiple fluid passage on-off valves 91–99 in the aforementioned fluid passages 20, 30, 40, 50, 60, 70, 81, 82. Specifically, the valve 93 is disposed in the intake passage 20 upstream of a joint between the intake passage 20 and the first interconnect passage 60, the valve 98 is disposed in the exhaust passage 30 downstream of a joint between the exhaust passage 30 and the EGR passage 40, the valve 99 is disposed in the EGR passage 40 downstream of the joint between the exhaust passage 30 and the EGR passage 40, the valve 92 is disposed in the EGR passage 40 upstream of a joint between the EGR passage 40 and the auxiliary intake passage 50, the valve 91 is disposed in the auxiliary intake passage 50 upstream of the joint between the EGR passage 40 and the auxiliary intake passage 50, the valve 94 is disposed in the first interconnect passage 60 downstream of a joint between the first interconnect passage 60 and the EGR passage 40, the valve 95 is disposed in the second interconnect passage 70 downstream of a joint between the second interconnect passage 70 and the intake passage 20, the valve 96 is disposed in the auxiliary EGR passage 81 upstream of a joint between the auxiliary EGR passage 81 and the EGR passage 40, and the valve 97 is disposed in the auxiliary EGR passage 82 downstream of a joint between the auxiliary EGR passage 82 and the EGR passage 40, for opening and closing the fluid passages 20, 30, 40, 50, 60, 70, 81, 82.

The two valves 91, 92 located close to the joint between the EGR passage 40 and the auxiliary intake passage 50 together constitute a first fluid channel regulator which determines whether to allow a fluid to flow through the auxiliary intake passage 50 or through a portion of the EGR passage 40 upstream of the aforementioned joint into the electrically-operated compressor 42. Similarly, the two valves 93, 94 located close to the joints between the intake passage 20 and the first interconnect passage 60 and between the EGR passage 40 and the first interconnect passage 60 together constitute a second fluid channel regulator which determines whether to allow the fluid in the EGR passage 40 to flow through the first interconnect passage 60 into the compressor 23 or the fluid (intake air) in the intake passage 20 to flow through the joint between the intake passage 20 and the first interconnect passage 60 into the compressor 23.

Figure 3:
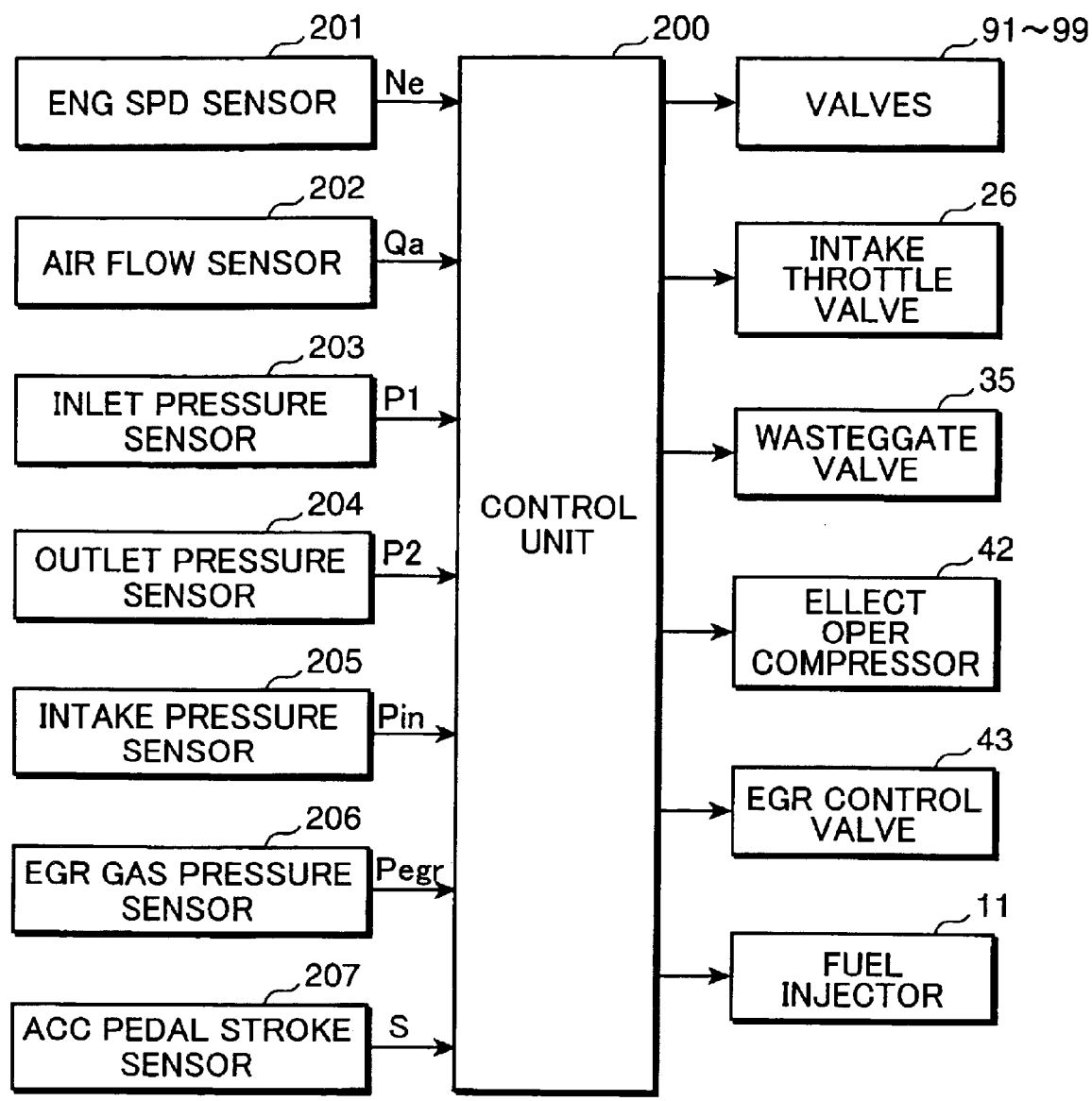
FIG. 3 is a block diagram of a control system centered around a control unit of the engine.

Referring to FIG. 3, the engine 10 is provided with a control unit 200 for controlling fuel injectors 11 for injecting fuel into the combustion chambers in the individual cylinders 100, for instance, in addition to the aforementioned multiple fluid passage on-off valves 91–99, the intake air throttle valve 26, the wastegate valve 35, the electrically-operated compressor 42 and the EGR control valve 43. The control unit 200 receives sensing signals from an engine speed sensor 201 for measuring engine speed Ne, an airflow sensor 202 for measuring the flow rate Qa of the intake air through the intake passage 20 and the auxiliary intake passage 50, an inlet pressure sensor 203 for detecting pressure P1 in the EGR passage 40 at a point immediately upstream of the electrically-operated compressor 42, an outlet pressure sensor 204 for detecting pressure P2 in the EGR passage 40 at a point immediately downstream of the electrically-operated compressor 42, an intake pressure sensor 205 for detecting pressure Pin in the intake manifold 27, an EGR gas pressure sensor 206 for detecting pressure Pegr in the EGR manifold 44 located at the downstream end of the EGR passage 40, and an accelerator pedal stroke sensor 207 for detecting the amount of depression S of an accelerator (not shown). The engine speed Ne and the intake air flow rate Qa are typical parameters representative of operating conditions of the engine 10.

Figure 4:
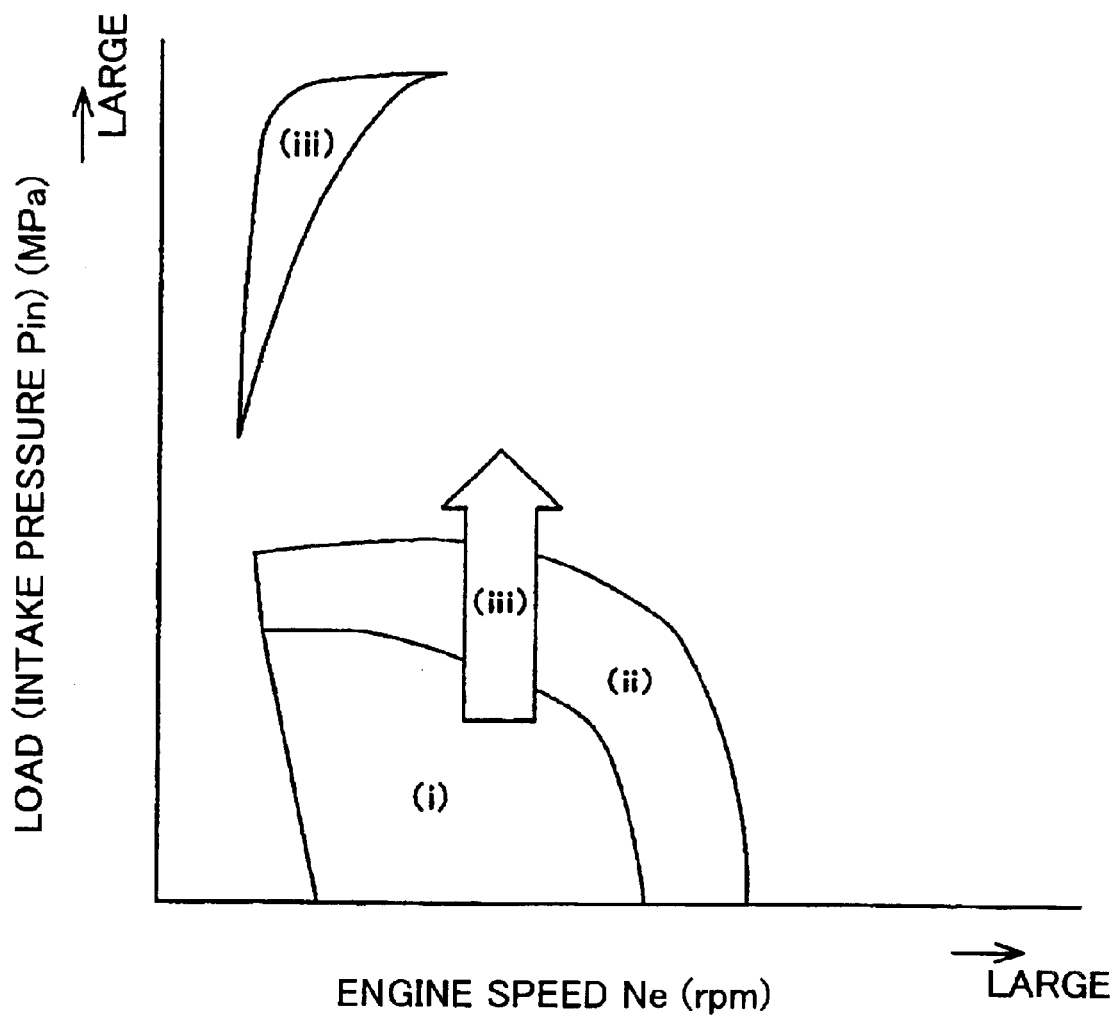
FIG. 4 shows a specific example of a characteristic chart used in EGR control operation performed by the control unit of FIG. 3.

The control unit 200 controls the engine 10 to recirculate the exhaust gas not only under low-load conditions (region i) but also under high-load conditions (region ii) as shown in FIG. 4. EGR control operation performed by the control unit 200 will be later discussed in detail. An advantage of recirculating the exhaust gas under high-load conditions is, in addition to a reduction in the amount of NOx emissions, as follows. Generally speaking, a state of higher temperature and higher pressure is created in the combustion chambers under high-load conditions, so that abnormal combustion is likely to occur due to premature self-ignition of fuel even when the fuel is injected during a compression stroke. The occurrence of such abnormal combustion accelerates production of particulates (soot). Introduction of the EGR gas which is burned gas into the combustion chambers in this situation makes it possible to retard self-ignition of the injected fuel. In other words, introduction of the EGR gas serves to lengthen a period of time from a point of fuel injection to a point of self-ignition. It is therefore possible to inject the fuel earlier by recirculating the exhaust gas under high-load conditions. This enables sufficiently premixed combustion and helps suppress the production of particulates (soot). Since this feature of the EGR system is important for protecting the global environment, it is desirable to enable recirculation of the EGR gas not only in the regions i and ii but also in all operating ranges of the engine 10 shown in FIG. 4.

In this embodiment, the control unit 200 stops EGR operation during acceleration shown by an arrow and a region iii in FIG. 4. Then, the control unit 200 controls the engine 10 to improve its output response which is an important factor during acceleration by using the aforementioned devices and facilities for the EGR operation which have become unnecessary as a result of stoppage of the EGR operation. Details of this control operation will be later discussed.

Figure 5:
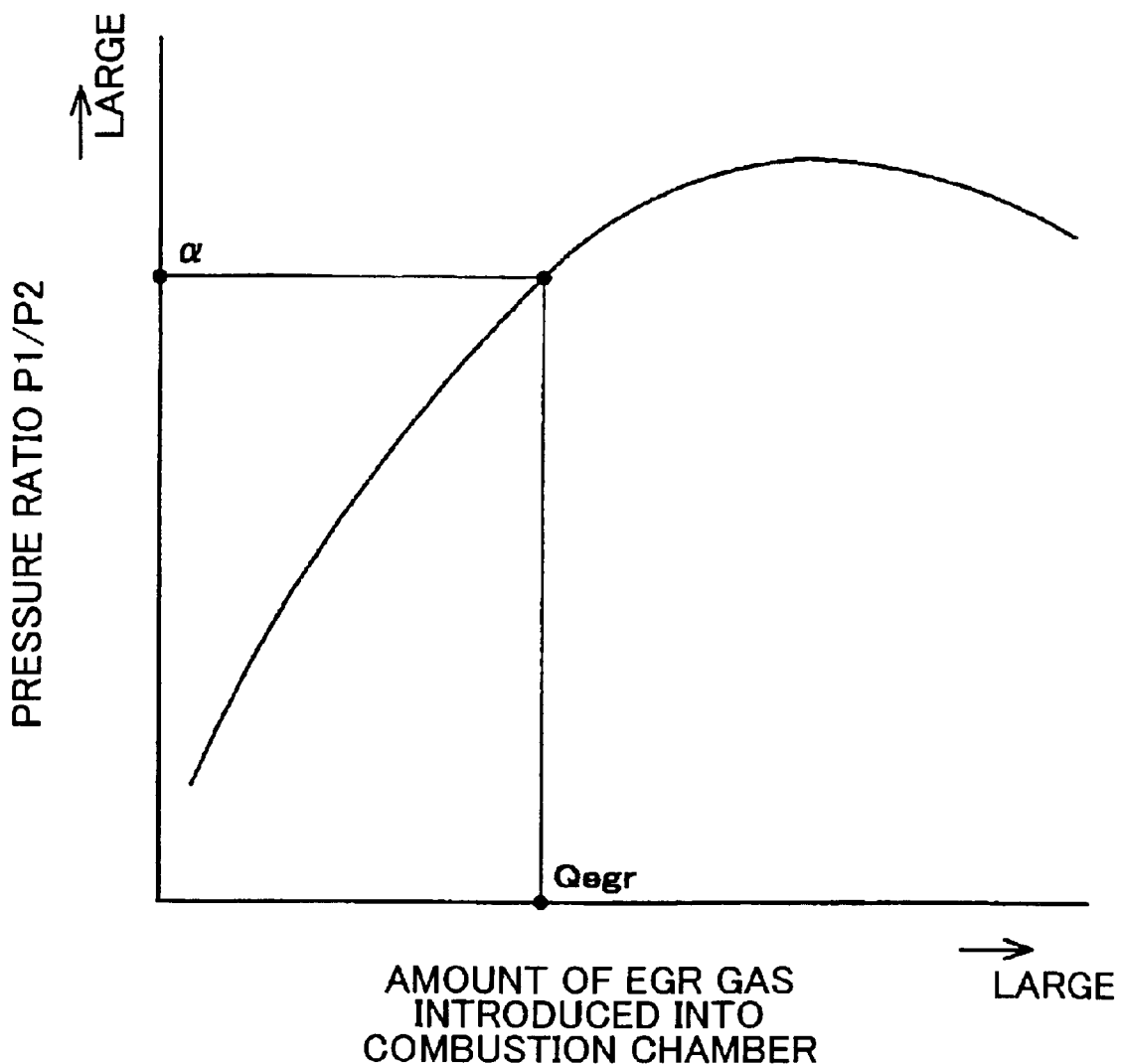
FIG. 5 shows a specific example of a characteristic chart used for controlling an electrically-operated compressor for increasing EGR gas pressure.

Referring now to FIG. 5, the EGR control operation performed by the control unit 200 of this embodiment is explained using a specific example. FIG. 5 shows a relationship between the amount of EGR gas introduced into the combustion chamber and a pressure ratio P1/P2 which is the ratio of the inlet pressure P1 of the electrically-operated compressor 42 measured in the EGR passage 40 immediately upstream of the electrically-operated compressor 42 to the outlet pressure P2 of the electrically-operated compressor 42 measured in the EGR passage 40 immediately downstream of the electrically-operated compressor 42. The inlet pressure P1 is approximately equal to atmospheric pressure in the engine structure of this embodiment as can be seen from FIG. 1. Therefore, approximating the inlet pressure P1 by the atmospheric pressure, the EGR gas pressure Pegr as measured in the EGR manifold 44, that is, the pressure in the EGR port 105 can substitute for the pressure ratio P1/P2 on the vertical axis of FIG. 5.

Generally, the EGR gas ratio is determined according to the operating conditions of the engine 10, and the amount of EGR gas Qegr is determined based on the EGR gas ratio and the amount of intake air (fresh air). If the amount of EGR gas for achieving an EGR gas ratio of 60% to 70%, for example, is Qegr, the pressure ratio P1/P2 should be set to α as shown in FIG. 5. The outlet pressure P2 depends on the revolving speed of a motor of the electrically-operated compressor 42 and the revolving speed of this motor depends on a period of time during which a driving voltage is applied to the motor. Accordingly, application of the driving voltage to the motor of the electrically-operated compressor 42 should be controlled by switching on and off a voltage source with proper timing to achieve a desired duty ratio while monitoring sensing results (P1, P2, Pegr) of the inlet pressure sensor 203, the outlet pressure sensor 204 and/or the EGR gas pressure sensor 206 such that the aforementioned pressure ratio α is obtained.

The EGR control operation performed by the control unit 200 under varying operating conditions of the engine 10 is now explained focusing in particular on fluid flow control. Shown in Table 1 below are working states of the individual valves 43, 91–99 under low-load conditions.

TABLE 1

| | Low-load conditions | | | | | | | | | |
|---|---|---|---|---|---|---|---|---|---|---|
| | First fluid channel regulator | | Second fluid channel regulator | | | | | | | EGR control valve |
| Valve | 91 | 92 | 93 | 94 | 95 | 96 | 97 | 98 | 99 | 43 |
| Example 1 of control operation | Closed | Closed | Open | Closed | Open | Open | Open | Open | Closed | Closed |
| Example 2 of control operation | Open | Closed | Open | Closed | Open | Open | Open | Open | Closed | Fully open |

When the control unit 200 judges that the engine 10 is under low-load conditions, the control unit 200 opens the valve 93 and closes the valve 94 such that the intake air in the intake passage 20 flows from upstream of the joint between the intake passage 20 and the first interconnect passage 60 into the compressor 23 as illustrated in FIG. 1. Consequently, the intake air flows through a flow channel A (FIG. 1) including the air cleaner 21, the intake passage 20, the valve 93, the supercharger compressor 23 (operating at a low supercharging ratio), the intercooler 25 and the intake air throttle valve 26 into the intake manifold 27 and is introduced into the individual cylinders 100. As the valve 95 is open under low-load conditions, the intake air which has passed through the intercooler 25 flows also through a flow channel B (FIG. 1) including the valve 95, the second interconnect passage 70 and part of the EGR passage 40 into the dedicated EGR manifold 44 and is introduced into the individual cylinders 100.

The aforementioned situation corresponds to Example 1 of control operation shown in Table 1. Under low-load conditions, the control unit 200 may open the valve 91 and close the valve 92 as shown in Example 2 of control operation of Table 1 such that the intake air flows also through the auxiliary intake passage 50 into the electrically-operated compressor 42. In this case, the intake air flows through a flow channel C (FIG. 1) including the air cleaner 21, the auxiliary intake passage 50, the valve 91, part of the EGR passage 40, the electrically-operated compressor 42 (operating at a low supercharging ratio) and the EGR control valve 43 (which is opened preferably to a point of maximum opening as shown in Table 1), the flow channel C eventually joining the aforementioned flow channel B.

On the other hand, the exhaust gas flows from the individual cylinders 100 through the exhaust manifold 36 and a flow channel D (FIG. 1) including the exhaust passage 30, the turbine 24, the emission control device 31 and the valve 98, which is opened, and is discharged into the atmosphere.

As the valve 99 is closed and the valves 96, 97 are open as shown in Table 1, the EGR gas is recirculated from the exhaust manifold 36 to the intake manifold 27 through a flow channel E (FIG. 1) including the auxiliary EGR passage 81, part of the EGR passage 40, the EGR cooler 41 and the auxiliary EGR passage 82 under low-load conditions. The EGR gas is mixed with the intake air (fresh air) in the intake manifold 27 and supplied into the individual cylinders 100.

As would be understood from the foregoing, a mixed fluid of the intake air (fresh air) and the EGR gas is introduced into the combustion chamber of each cylinder 100 through the first ports (intake ports) 101, 102, whereas only the intake air (fresh air) is introduced into the combustion chamber through the second port (EGR port) 105 as illustrated in FIG. 2.

Shown in Table 2 below are working states of the individual valves 43, 91–99 under high-load conditions.

TABLE 2

| | High-load conditions | | | | | | | | | |
|---|---|---|---|---|---|---|---|---|---|---|
| | First fluid channel regulator | | Second fluid channel regulator | | | | | | | EGR control valve |
| Valve | 91 | 92 | 93 | 94 | 95 | 96 | 97 | 98 | 99 | 43 |
| Example of control operation | Closed | Open | Open | Closed | Closed | Closed | Closed | Open | Open | Open to a controlled point |

Figure 6:
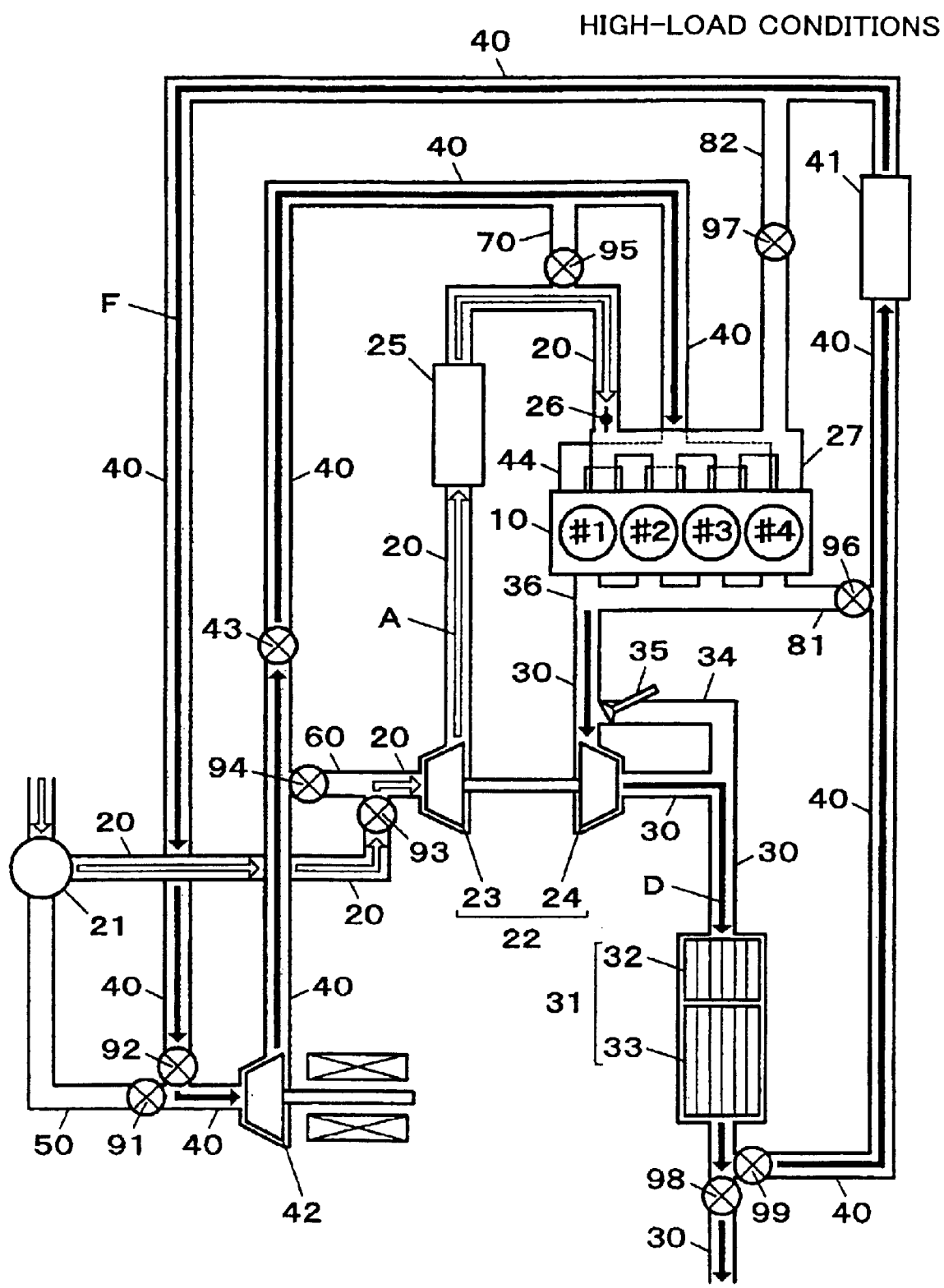
FIG. 6 is a diagram similar to FIG. 1 showing flows of the intake air, the exhaust gas and the EGR gas under high-load conditions.

When the control unit 200 judges that the engine 10 is under high-load conditions, the control unit 200 opens the valve 93 and closes the valve 94 such that the intake air is introduced into the individual cylinders 100 through the aforementioned flow channel A and the intake manifold 27 in the same fashion as under the low-load conditions as illustrated in FIG. 6. In this case, however, the aforementioned flow channel B is not formed because the valve 95 is closed.

On the other hand, the EGR gas is recirculated from the exhaust passage 30 to the dedicated EGR manifold 44 through the entire length of the EGR passage 40. Since the valves 91, 96, 97 are closed and the valves 92, 99 are open, the EGR gas flows through the aforementioned portion of the EGR passage 40 upstream of the joint between the EGR passage 40 and the auxiliary intake passage 50 into the electrically-operated compressor 42. As a consequence, the EGR gas flows through a flow channel F (FIG. 6) including the valve 99, the EGR passage 40, the EGR cooler 41, the valve 92, the electrically-operated compressor 42, the EGR control valve 43 (which should be opened preferably to a controlled opening point as shown in Table 2) into the EGR manifold 44 and is introduced into the individual cylinders 100. Thus, the EGR gas and the intake air (fresh air) do not mix until they are introduced into the combustion chambers.

It is recognized from the foregoing that only the intake air (fresh air) is introduced into the combustion chamber of each cylinder 100 through the first ports (intake ports) 101, 102, whereas only the EGR gas is introduced into the combustion chamber through the second port (EGR port) 105 as illustrated in FIG. 2.

Shown in Table 3 below are working states of the individual valves 43, 91–99 during acceleration.

TABLE 3

Acceleration

| Valve | First fluid channel regulator | | Second fluid channel regulator | | | | | | | EGR control valve |
|---|---|---|---|---|---|---|---|---|---|---|
| | 91 | 92 | 93 | 94 | 95 | 96 | 97 | 98 | 99 | 43 |
| Example of control operation | Open | Closed | Closed | Open | Open | Closed | Closed | Open | Closed | Closed |

Figure 8:
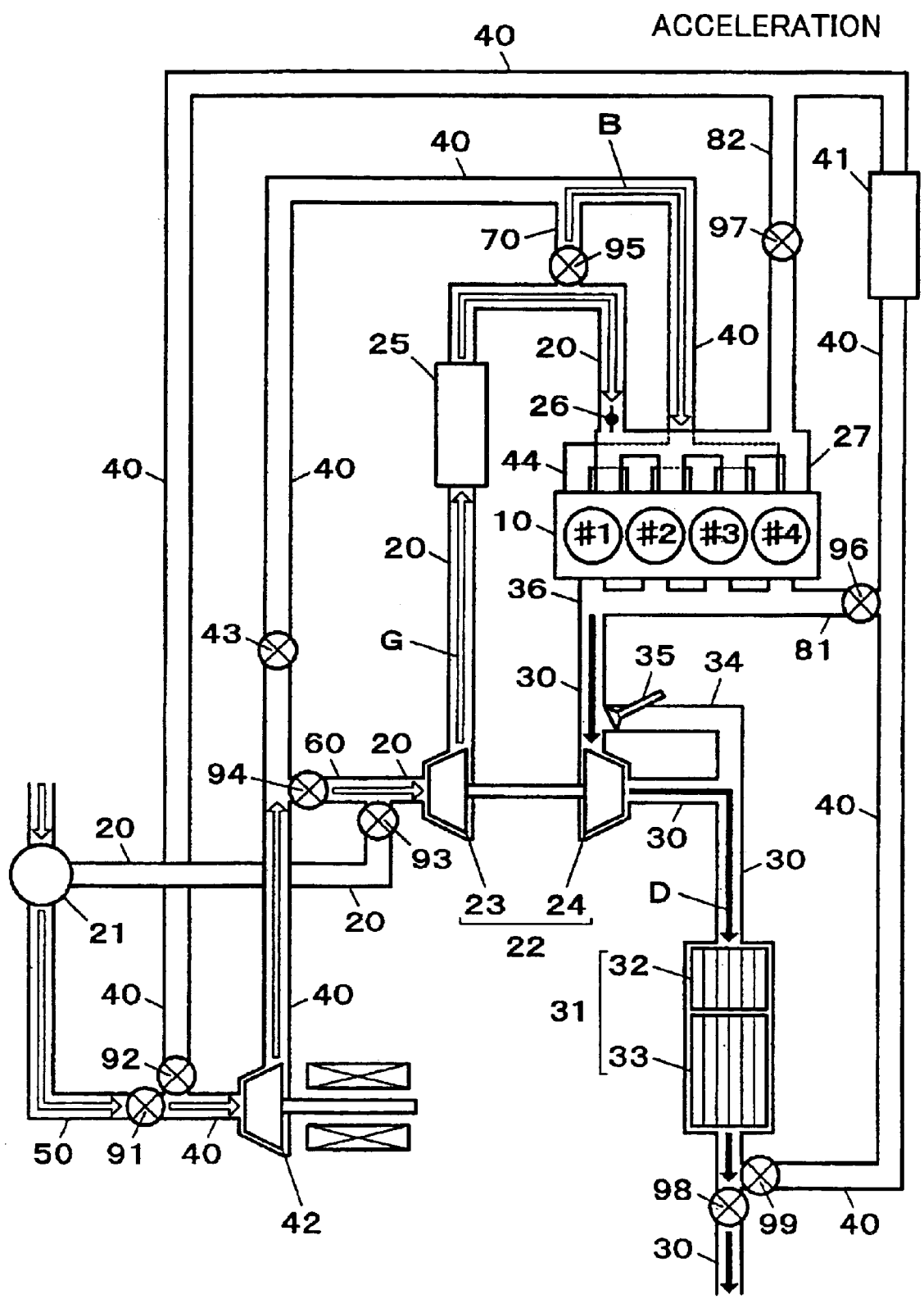
FIG. 8 is a diagram similar to FIG. 1 showing flows of the intake air, the exhaust gas and the EGR gas during acceleration.

When the control unit 200 judges that the engine 10 is accelerating, the control unit 200 opens the valve 91 and closes the valve 92 to allow the intake air to flow through the auxiliary intake passage 50 into the electrically-operated compressor 42 and opens the valve 94 and closes the valve 93 and the EGR control valve 43 to allow the intake air to flow through the first interconnect passage 60 into the compressor 23 as illustrated in FIG. 8. As a consequence, the intake air flows through a flow channel G (FIG. 8) including the air cleaner 21, the auxiliary intake passage 50, the valve 91, part of the EGR passage 40, the electrically-operated compressor 42 (operating at a maximum supercharging ratio), the valve 94, the first interconnect passage 60, the supercharger compressor 23 (operating at a high supercharging ratio), part of the intake passage 20, the intercooler 25 and the intake air throttle valve 26 into the intake manifold 27 and is introduced into the individual cylinders 100. To operate the electrically-operated compressor 42 at the maximum supercharging ratio, the electrically-operated compressor 42 is run at a maximum speed by applying the driving voltage to the motor of the electrically-operated compressor 42 at a maximum duty ratio (e.g., 100%), for instance. As the valve 95 is opened as shown in Table 3, there is also formed the aforementioned flow channel B so that the intake air which has passed through the intercooler 25 is also introduced through the EGR manifold 44 into the individual cylinders 100 during acceleration of the engine 10.

On the other hand, the EGR gas is not recirculated from exhaust side back to intake side during acceleration because the valves 99, 96, 97, 92 are all closed.

Figure 9:
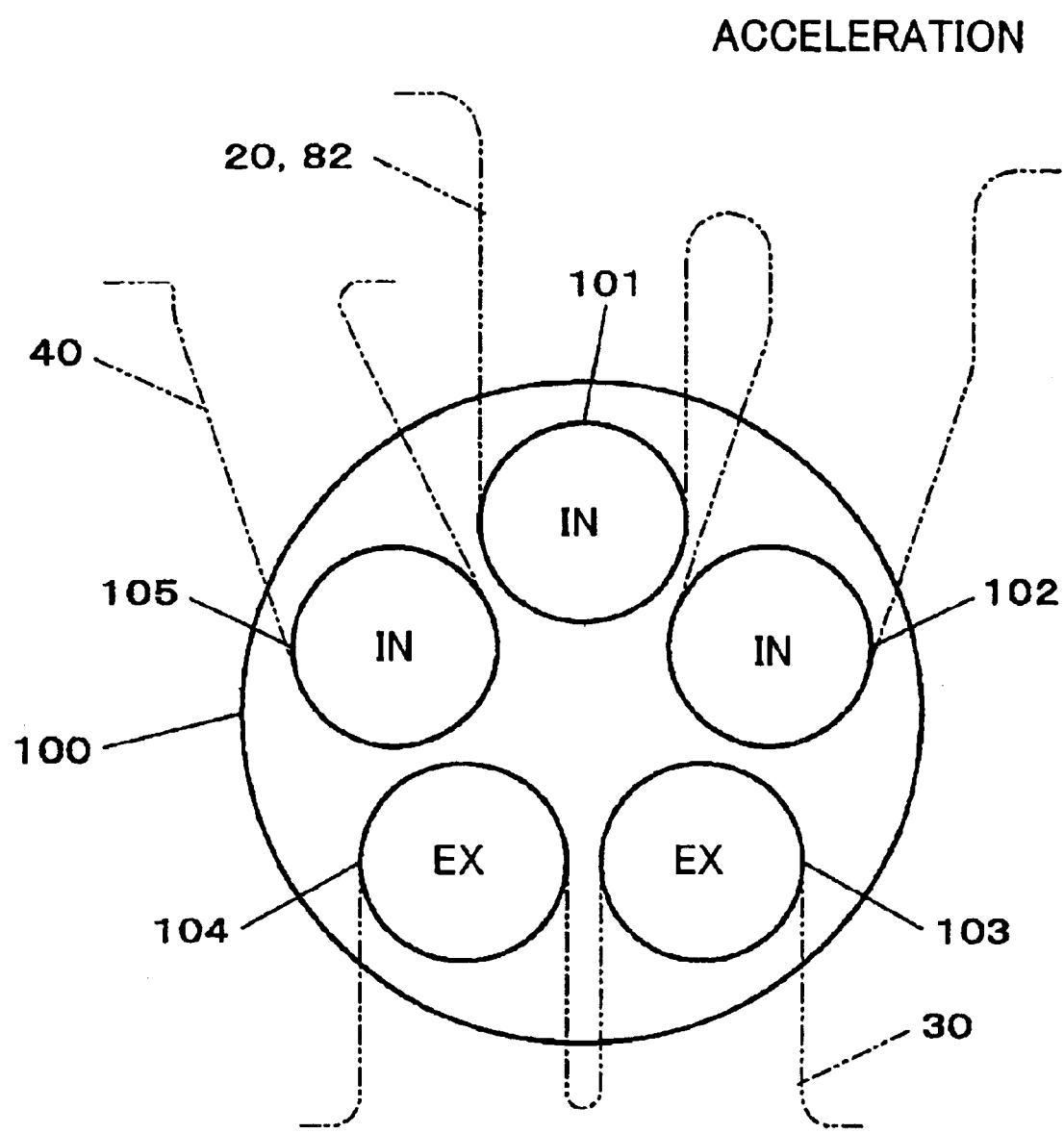
FIG. 9 is an explanatory diagram similar to FIG. 2 showing a relationship between the ports and types of fluids flowing through the individual ports during acceleration.

It is recognized from the foregoing that only the intake air (fresh air) is introduced into the combustion chamber of each cylinder 100 through the first ports (intake ports) 101, 102 and through the second port (EGR port) 105 during acceleration as illustrated in FIG. 9.

Figure 7:
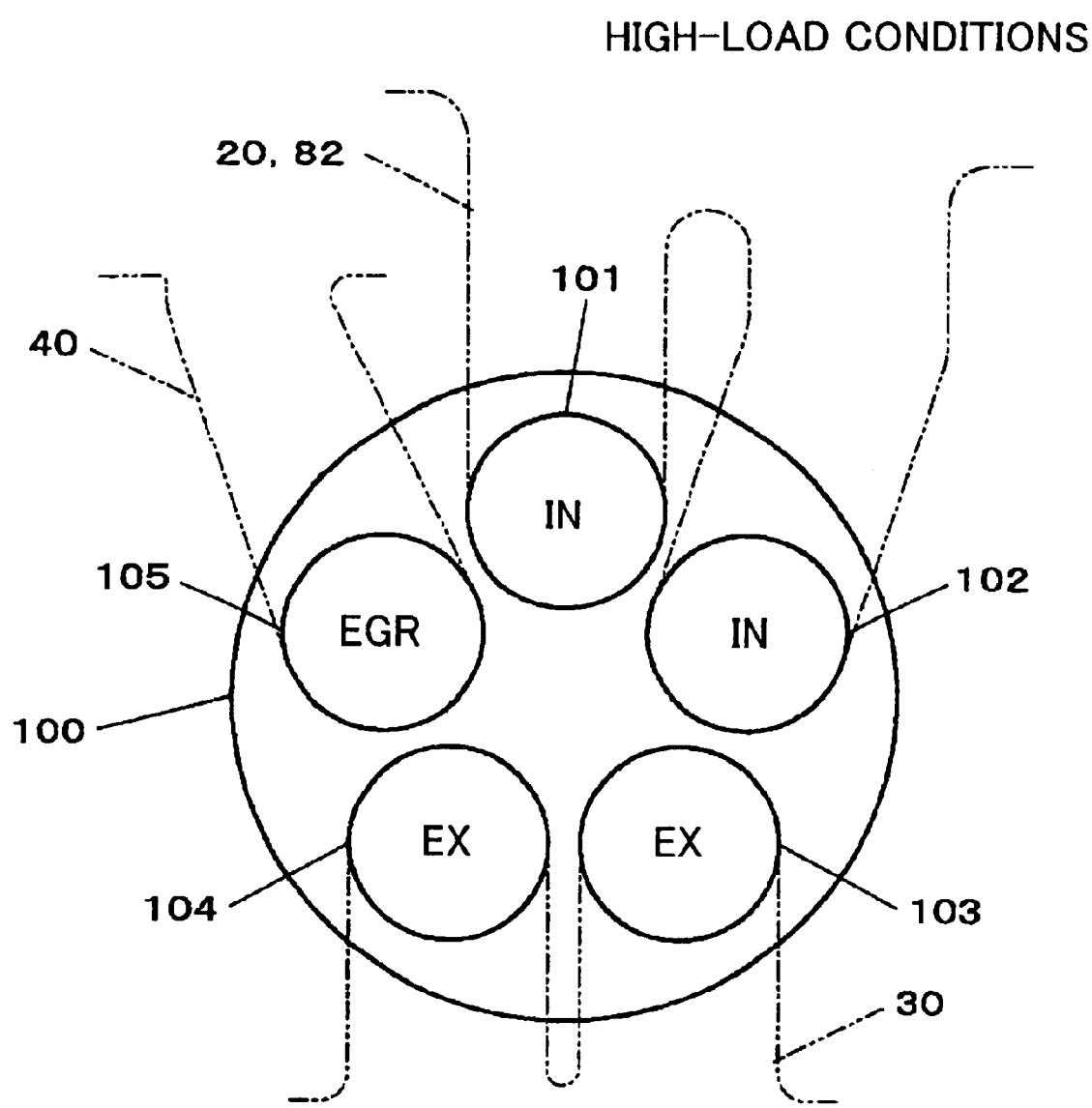
FIG. 7 is an explanatory diagram similar to FIG. 2 showing a relationship between the ports and types of fluids flowing through the individual ports under high-load conditions.

As is apparent from FIGS. 2, 7 and 9, it is possible to introduce the EGR gas into the combustion chambers regardless of the influence of intake pressure in the intake passage 20 as there is provided the second port 105 to which the EGR passage 40 is connected independently of the first ports 101, 102 to which the intake passage 20 is connected. It is also apparent from FIGS. 1, 6 and 8 that the EGR gas can be forcibly introduced into the combustion chambers through the second port 105 (see FIG. 7) regardless of the operating conditions of the engine 10 even under high-load conditions in the region ii of FIG. 4 by increasing the EGR gas pressure Pegr by means of the compressor 42. This is because the compressor 42 is provided in the EGR passage 40 to control the pressure at which the EGR gas is introduced into the combustion chambers.

Furthermore, it is apparent from FIGS. 1, 6 and 8, particularly from FIG. 6, that the temperature of the EGR gas is relatively low and the EGR gas is taken from the exhaust gas (burned gas) from which unburned components and particulates have been removed. This is because the EGR passage 40 branches out from the exhaust passage 30 at the point downstream of the emission control device 31 as previously mentioned. This arrangement serves to ensure heat resistance, durability and reliability of the compressor 42 even though the compressor 42 disposed in the EGR passage 40 is exposed to the EGR gas. The arrangement of the embodiment is advantageous for ensuring heat resistance, durability and reliability of the EGR control valve 43 as well, because the EGR control valve 43 for regulating the amount of EGR gas introduced into the combustion chambers is located further downstream of the compressor 42 in the EGR passage 40.

Additionally, since the aforementioned compressor 42 is electrically driven, this compressor 42 can control the EGR gas pressure Pegr (or the outlet pressure P2 shown in FIG. 5) with quick response and high accuracy compared to a case where a mechanically-operated compressor is employed.

Even when the intake pressure Pin is increased by the supercharger 22 and it becomes more difficult to supply the EGR gas, the aforementioned compressor 42 correspondingly increases the EGR gas pressure Pegr. It is therefore possible to introduce the EGR gas into the combustion chambers even in such a situation.

In this embodiment, the intake passage 20, the EGR passage 40, the auxiliary intake passage 50 and the first interconnect passage 60 can be combined in various ways to alter the selection of the flow channels A, C, G for supplying the intake air into the combustion chambers and the flow channel F for introducing the EGR gas into the combustion chambers by properly controlling the first fluid channel regulator including the valves 91, 92 and the second fluid channel regulator including the valves 93, 94 according to the operating conditions of the engine 10. Here, the second fluid channel regulator may further include the EGR control valve 43 depending on the situation as can be seen from FIG. 8. It is therefore possible to supply the intake air and the EGR gas into the combustion chambers in a manner suited to the operating conditions of the engine 10.

As is apparent from FIGS. 6 and 7, the intake air and the EGR gas are not premixed but introduced independently of each other into the combustion chamber under high-load conditions. Therefore, the two kinds of fluids are supplied in quantities that are needed for proper combustion in the combustion chamber with high accuracy.

As is apparent from FIGS. 8 and 9, introduction of the EGR gas into the combustion chamber is interrupted during acceleration so that the compressor 42 becomes unnecessary for controlling the EGR gas pressure Pegr. In this situation, the compressor 42 is efficiently used as a device in the flow channel G for supplying the intake air at an increased pressure (supercharging). Consequently, the compressor 42 and the supercharger compressor 23 which are connected in series together constitute a dual-stage supercharging system for increasing the intake pressure Pin. This feature serves to improve the output response of the engine 10 which is one of important characteristics for engine performance during acceleration.

Further, it can be seen from FIGS. 8 and 9 that the second port (EGR port) 105 provided for introducing the EGR gas into the combustion chamber independently of the intake air becomes unnecessary for its original purpose during acceleration as the introduction of the EGR gas is interrupted. In this situation, the second port (EGR port) 105 is used for introducing the intake air into the combustion chamber through the aforementioned flow channel B during acceleration. Consequently, the intake air can be introduced in large quantities through not only the first ports (intake ports) 101, 102 but also the second port (EGR port) 105 with low resistance to fluid flow. This feature also serves to improve the output response of the engine 10 which is one of important characteristics for engine performance during acceleration. As is apparent from FIGS. 1 and 2, the same advantageous effect of the flow channel B is obtained under low-load conditions as well.

While the foregoing embodiment represents one of the best modes for carrying out the present invention, it is to be understood that the invention is not limited in its application to this specific embodiment but various changes and modifications may be made without departing from the spirit and scope of the appended claims. As is apparent from FIGS. 1, 6 and 8, the invention can be embodied without any substantial influence on the execution thereof even when the second interconnect passage 70 and the valve 95 are eliminated. This is because the intake air can be introduced into the individual combustion chambers through the intake passage 20 (or through the flow channel A or G) without using a downstream portion of the EGR passage 40 as part of the intake passage to form the flow channel B under low-load conditions and during acceleration illustrated in FIGS. 1 and 8, respectively. Under high-load conditions illustrated in FIG. 6, the second interconnect passage 70 and the valve 95 are not necessary at all because the flow channels A or F formed independently of each other by the intake passage 20 and the EGR passage 40 are used.

In sum, according to the invention, an EGR control apparatus of, an engine includes a first port to which an intake passage is connected, the first port opening into a combustion chamber of the engine, a second port to which an EGR passage branching out from an exhaust passage is connected, the second port opening into the combustion chamber of the engine, an electrically-operated pressure controller disposed in the EGR passage for regulating pressure at which EGR gas is introduced into the combustion chamber, and an EGR control valve disposed in the EGR passage at a point downstream of the pressure controller for controlling the amount of EGR gas introduced into the combustion chamber, wherein the EGR passage branches out from the exhaust passage at a point downstream of an emission control device disposed in the exhaust passage.

In this construction, the second port to which the EGR passage is connected and the first port to which the intake passage is connected function independently of each other. It is therefore possible to introduce the EGR gas into the combustion chamber regardless of the influence of intake pressure in the intake passage. Additionally, the EGR gas can be forcibly introduced into the combustion chamber through the second port regardless of the operating conditions of the engine even under high-load conditions by increasing the EGR gas pressure by means of the pressure controller (compressor). This is because the pressure controller is provided in the EGR passage to control the pressure at which the EGR gas is introduced into the combustion chamber.

Furthermore, the temperature of the EGR gas is relatively low and the EGR gas is taken from exhaust gas from which unburned components and particulates have been removed. This is because the EGR passage branches out from the exhaust passage downstream of the emission control device. This arrangement serves to ensure heat resistance, durability and reliability of the pressure controller (compressor) even though the pressure controller disposed in the EGR passage is exposed to the EGR gas. The arrangement of the invention is advantageous for ensuring heat resistance, durability and reliability of the EGR control valve as well, because the EGR control valve for regulating the amount of EGR gas introduced into the combustion chamber is located further downstream of the pressure controller in the EGR passage.

Additionally, since the pressure controller is an electrically driven compressor, the pressure controller can control the EGR gas pressure with quick response and high accuracy compared to a case where a mechanically-operated pressure controller is employed.

According to one feature of the invention, the aforementioned EGR control apparatus of the engine further includes a supercharger, in which a turbine disposed in the exhaust passage upstream of a point where the EGR passage branches out from the exhaust passage drives a compressor disposed in the intake passage.

Even when the intake pressure is increased by the supercharger and it becomes more difficult to supply the EGR gas, the aforementioned pressure controller (compressor) correspondingly increases the EGR gas pressure in the EGR control apparatus of the invention. It is therefore possible to introduce the EGR gas into the combustion chamber even in such a situation.

According to another feature of the invention, the EGR control apparatus of the engine further includes an auxiliary intake passage connecting the intake passage to the EGR passage at a point upstream of the pressure controller to enable introduction of the intake air into the EGR passage, a first fluid channel regulator for determining whether to allow a fluid to flow through the auxiliary intake passage or through a portion of the EGR passage upstream of a joint between the EGR passage and the auxiliary intake passage into the pressure controller, an interconnect passage branching out from the EGR passage at a point between the pressure controller and the EGR control valve and connecting to the intake passage at a point upstream of the compressor of the supercharger, a second fluid channel regulator for determining whether to allow the fluid to flow through the interconnect passage or through a portion of the intake passage upstream of a joint between the intake passage and the interconnect passage into the compressor of the supercharger, an operating condition sensing device for detecting operating conditions of the engine, and a control unit for controlling the first fluid channel regulator and the second fluid channel regulator according to the operating conditions of the engine detected by the operating condition sensing device.

In this construction, the intake passage, the EGR passage, the auxiliary intake passage and the interconnect passage can be combined in various ways to alter the selection of flow channels for supplying the intake air into the combustion chambers and for introducing the EGR gas into the combustion chambers by properly controlling the first fluid channel regulator and the second fluid channel regulator according to the operating conditions of the engine. It is therefore possible to supply the intake air and the EGR gas into the combustion chambers in a manner suited to the operating conditions of the engine.

In the EGR control apparatus of the engine according to still another feature of the invention, the control unit controls the first fluid channel regulator and the second fluid channel regulator in such a manner that the fluid flows through the aforementioned portion of the EGR passage upstream of the joint between the EGR passage and the auxiliary intake passage into the pressure controller and the fluid flows through the aforementioned portion of the intake passage upstream of the joint between the intake passage and the interconnect passage into the compressor of the supercharger when the operating condition sensing device determines that the engine is under high-load conditions.

According to this feature of the invention, the intake air and the EGR gas are not premixed but introduced independently of each other into the combustion chamber under high-load conditions. Therefore, the two kinds of fluids are supplied in quantities that are needed for proper combustion in the combustion chamber with high accuracy.

In the EGR control apparatus of the engine according to yet another feature of the invention, the control unit controls the first fluid channel regulator and the second fluid channel regulator in such a manner that the fluid flows through the auxiliary intake passage into the pressure controller and the fluid flows through the interconnect passage into the compressor of the supercharger when the operating condition sensing device determines that the engine is accelerating.

According to this feature of the invention, introduction of the EGR gas into the combustion chamber is interrupted during acceleration of the engine so that the pressure controller becomes unnecessary for controlling the EGR gas pressure. In this situation, the pressure controller is used as a device for supplying the intake air at an increased pressure (supercharging). Consequently, the pressure controller and the supercharger which are connected in series together constitute a dual-stage supercharging system for increasing the intake pressure. This feature serves to improve output response of the engine which is one of important characteristics for engine performance during acceleration.

According to a further feature of the invention, the EGR control apparatus of the engine further includes a second interconnect passage branching out from the EGR passage at a point downstream of the EGR control valve and connecting to the intake passage at a point downstream of the compressor of the supercharger through an on-off valve, wherein the control unit opens the on-off valve when the operating condition sensing device determines that the engine is accelerating.

In the EGR control apparatus thus constructed, the second port provided for introducing the EGR gas into the combustion chamber independently of the intake air becomes unnecessary for its original purpose during acceleration as the introduction of the EGR gas is interrupted. In this situation, the second port is used for introducing the intake air into the combustion chamber during acceleration. Consequently, the intake air can be introduced in large quantities through not only the first port but also the second port with low resistance to fluid flow. This feature also serves to improve the output response of the engine which is one of important characteristics for engine performance during acceleration.

Overall, the EGR control apparatus of the invention enables introduction of the EGR gas into the combustion chamber regardless of the operating conditions of the engine even under high-load conditions and an improvement in heat resistance, durability and reliability of the pressure controller disposed in the EGR passage. Accordingly, the present invention has a wide industrial applicability in technical fields related to EGR systems used in the engine.

This application is based on Japanese patent application serial no. 2003-270339, filed in Japan Patent Office on Jul. 2, 2003, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An EGR control apparatus of an engine, said EGR control apparatus comprising:

a first port to which an intake passage is connected, the first port opening into a combustion chamber of the engine;

a second port to which an EGR passage branching out from an exhaust passage is connected, the second port opening into the combustion chamber of the engine;

an electrically-operated pressure controller disposed in the EGR passage for regulating pressure at which EGR gas is introduced into the combustion chamber;

an EGR control valve disposed in the EGR passage at a point downstream of the pressure controller for controlling the amount of EGR gas introduced into the combustion chamber;

wherein the EGR passage branches out from the exhaust passage at a point downstream of an emission control device disposed in the exhaust passage;

a supercharger, in which a turbine disposed in the exhaust passage upstream of a point where the EGR passage branches out from the exhaust passage drives a compressor disposed in the intake passage;

an auxiliary intake passage connecting the intake passage to the EGR passage at a point upstream of the pressure controller to enable introduction of the intake air into the EGR passage;

a first fluid channel regulator for switching a fluid passage between a passage allowing fluid to flow through the auxiliary intake passage and a passage allowing fluid to flow through a portion of the EGR passage upstream of joint between the EGR passage and the auxiliary intake passage into the pressure controller;

an interconnect passage branching out from the EGR passage at a point between the pressure controller and the EGR control valve and connecting to the intake passage at a point upstream of the compressor of the supercharger;

a second fluid channel regulator for switching a fluid passage between a passage allowing the fluid to flow through the interconnect passage and a passage allowing the fluid to flow through a portion of the intake passage upstream of a joint between the intake passage and the interconnect passage into the compressor of the supercharger;

an operating condition sensing device for detecting operating conditions of the engine; and a control unit for controlling the first fluid channel regulator and the second fluid channel regulator according to the operating conditions of the engine detected by the operating condition sensing device.

2. The EGR control apparatus of the engine according to claim 1, wherein the control unit controls the first fluid channel regulator and the second fluid channel regulator in such a manner that the fluid flows through said portion of the EGR passage upstream of the joint between the EGR passage and the auxiliary intake passage into the pressure controller and the fluid flows through said portion of the intake passage upstream of the joint between the intake passage and the interconnect passage into the compressor when the operating condition sensing device determines that the engine is under high-load conditions.

3. The EGR control apparatus of the engine according to claim 1, wherein the control unit controls the first fluid channel regulator and the second fluid channel regulator in such a manner that the fluid flows through the auxiliary intake passage into the pressure controller and the fluid flows through the interconnect passage into the compressor when the operating condition sensing device determines that the engine is accelerating.

4. The EGR control apparatus of the engine according to claim 3, further comprising:

a second interconnect passage branching out from the EGR passage at a point downstream of the EGR control valve and connecting to the intake passage at a point downstream of the compressor through an on-off valve;

wherein the control unit opens the on-off valve when the operating condition sensing device determines that the engine is accelerating.

* * * * *